United States Patent
Harrison et al.

(10) Patent No.: US 9,262,509 B2
(45) Date of Patent: Feb. 16, 2016

(54) METHOD AND SYSTEM FOR SEMANTIC DISTANCE MEASUREMENT

(75) Inventors: Paul Harrison, Keller, TX (US); James Oliphant, Pleasant Grove, UT (US); Hal Fulton, Austin, TX (US); Armin Roehrl, Koetzting (DE)

(73) Assignee: Collective, Inc., New York, NY (US)

( * ) Notice: Subject to any disclaimer, the term of this patent is extended or adjusted under 35 U.S.C. 154(b) by 0 days.

(21) Appl. No.: 12/616,505

(22) Filed: Nov. 11, 2009

(65) Prior Publication Data

US 2010/0228733 A1    Sep. 9, 2010

Related U.S. Application Data (60) Provisional application No. 61/198,959, filed on Nov. 12, 2008.

(51) Int. Cl.
G06F 17/30    (2006.01)
G06F 7/00    (2006.01)

(52) U.S. Cl.
CPC .... G06F 17/30613 (2013.01); G06F 17/30705 (2013.01); G06F 17/30731 (2013.01)

(58) Field of Classification Search
None
See application file for complete search history.

(56) References Cited

U.S. PATENT DOCUMENTS

| | | | |
|---|---|---|---|
| 5,251,131 A | 10/1993 | Masand et al. | |
| 5,727,199 A | 3/1998 | Chen et al. | |
| 6,026,399 A | 2/2000 | Kohavi et al. | |
| 6,044,375 A | 3/2000 | Shmueli et al. | |
| 6,134,532 A | 10/2000 | Lazarus et al. | |
| 6,523,026 B1 * | 2/2003 | Gillis | |
| 7,194,471 B1 | 3/2007 | Nagatsuka et al. | |
| 7,716,216 B1 * | 5/2010 | Harik et al. | 707/724 |
| 7,925,610 B2 * | 4/2011 | Elbaz et al. | 706/55 |
| 2003/0023488 A1 | 1/2003 | Landsman et al. | |
| 2003/0182304 A1 | 9/2003 | Summerlin et al. | |
| 2004/0034633 A1 | 2/2004 | Rickard | |
| 2004/0088157 A1 * | 5/2004 | Lach et al. | 704/9 |
| 2004/0215509 A1 | 10/2004 | Perry | |
| 2004/0215515 A1 | 10/2004 | Perry | |
| 2004/0254911 A1 | 12/2004 | Grasso et al. | |
| 2005/0154781 A1 | 7/2005 | Carlson et al. | |
| 2005/0216823 A1 * | 9/2005 | Petersen et al. | 715/501.1 |
| 2006/0080293 A1 | 4/2006 | Nahum | |
| 2007/0022085 A1 | 1/2007 | Kulkarni | |
| 2007/0073678 A1 * | 3/2007 | Scott et al. | 707/5 |
| 2007/0143296 A1 | 6/2007 | Casion | |
| 2007/0300152 A1 | 12/2007 | Baugher | |
| 2008/0059486 A1 | 3/2008 | Pappas | |

(Continued)

OTHER PUBLICATIONS

Thomas, Paul. Generalising Multiple Capture-Recapture to Non-Uniform Sample Sizes. SIGIR'08, Jul. 20-24, 2008.*

(Continued)

*Primary Examiner* — Alicia Willoughby
(74) *Attorney, Agent, or Firm* — Morgan Lewis & Bockius LLP (57) ABSTRACT

A system and method for performing classification using semantic distance measurements. Items of electronic content accessed by individuals over a global communications network are identified. A set of content that includes the plurality of identified items of electronic content are stored. The set of content is normalized. Each of the keywords contained the set of content is identified and a semantic distance between each of the identified keywords is measured.

6 Claims, 6 Drawing Sheets

(56) References Cited

U.S. PATENT DOCUMENTS

| | | | |
|---|---|---|---|
| 2008/0104032 A1 | 5/2008 | Sarkar | |
| 2008/0114738 A1* | 5/2008 | Chao | 707/3 |
| 2008/0275753 A1 | 11/2008 | Protheroe et al. | |
| 2008/0275777 A1 | 11/2008 | Protheroe et al. | |
| 2009/0006363 A1 | 1/2009 | Canny et al. | |
| 2009/0074306 A1* | 3/2009 | Liu et al. | 382/229 |
| 2009/0089277 A1* | 4/2009 | Cheslow | 707/5 |
| 2009/0150363 A1* | 6/2009 | Gross et al. | 707/3 |

OTHER PUBLICATIONS

Goodman, Leo A. et al. Measures of Association for Cross Classifications. New York, Springer-Verlag, 1979. pp. 11, 29-30, 37, 67 and 120.*

International Preliminary Report Report on Patentability (Chapter 1 of the Patent Cooperation Treaty) PCT/US2009063994; International filing date Nov. 11, 2009 (6 pages).

International Search Report and Written Opinion of the International Searching Authority; International Application No. PCT/US2009/063994; International Filing Date Nov. 11, 2009; 7 pages.

PCT International Preliminary Report on Patentability, PCT/US2010/022176, dated Aug. 11, 2011 (2 pages) attaching PCT Written Opinion of the International Searching Authority, dated Mar. 12, 2010 (3 pages).

PCT International Preiminary Report on Patentability, PCT/US2010/041353, dated Jan. 19, 2012 (5 pages) attaching PCT International Search Report and Written Opinion of the International Searching Authority dated Sep. 1, 2010 (7 pages).

Chavez-Demoulin, V.C., et al.; The WEB archives: A time-machine in your pocket!; Feb. 14, 2000, www.approximity.com/papers/archive13 (16 pages).

Cilibrasi, Rudi L., et al.; The Google Similarity Distance; IEEE Transactions on Knowledge and Data Engineering, Mar. 2007, vol. 19, No. 3, pp. 370-383 (15 pages).

Domingos, Pedro, et al.; On the Optimality of the Simple Bayesian Classifier under Zero-One Loss; Machine Learning, vol. 29, pp. 103-130 (1997) (28 pages).

Gupta, Aarti, et al.; Using Ontologies and the Web to Learn Lexical Semantics, IJ CAI, 2007, pp. 1618-1623 (6 pages).

Kotisiantis, S.B., et al.; Logitboost of Simple Bayesian Classifier; Informatica, 2005 vol. 29, pp. 53-59, (7 pages).

Zhang, Harry; The Optimality of Naive Bayes; 2004, American Association for Artificial Intelligence (www.aaai.org) (6 Pages).

Wong, Wilson, et al.; Tree-Traversing Ant Algorithm for term clustering based on featureless similarities; (2007) Data Min. Knowl. Disc., vol. 15, pp. 349-381 (33 pages).

Rish, I; An empirical study of the naive Bayes classifier, IJCAI 2001 Workshop of Empircal Methods in Artificial Intelligence (6 pages).

Minsky, Marvin; Steps Toward Artificial Intelligence; Dept. of Mathematics, MIT, Research Lab. of Electronics, MIT received Oct. 24, 1960 (72 pages).

McCallum, Andrew, et al.; A Comparison of Event Models for Naive Bayes Test Classification, AAAI/ICML-98 Workshop on Learning for Text Classification; AAAI Press—1998—Vols. Technical Report WS-98-05, pp. 41-48 (8 pages).

PCT International Search Report and the Written Opinion of the International Searching Authority PCT/US09/04580, dated Sep. 24, 2009 (4 pages).

European Search Report issued on Dec. 6, 2012 in counterpart European Patent Application No. 09826653.9.

Wu et al., "Finding More Useful Information Faster From Web Search Results", Proceedings of the Twelfth International Conference on Information and Knowledge Management, CIKM '03 (Jan. 1, 2003), p. 568.

* cited by examiner

METHOD AND SYSTEM FOR SEMANTIC DISTANCE MEASUREMENT

CROSS REFERENCE TO RELATED APPLICATIONS

This application claims the benefit of the U.S. Provisional Patent Application No. 61/198,959 filed on Nov. 12, 2008, which is hereby incorporated by reference.

FIELD OF THE INVENTION

The present invention relates to methodologies for classifying text including semantic distance measurements.

SUMMARY OF THE INVENTION

The present invention is directed to a system and method for performing classification using semantic distance measurements. Items of electronic content accessed by individuals over a global communications network are identified. A set of content that includes the identified items of electronic content is stored. The set of content is normalized. Each of the keywords contained the set of content are identified and a semantic distance between each of the identified keywords is measured.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the embodiments of the present invention, examples of which are illustrated in the accompanying drawings. Wherever possible, like reference numbers will be used for like elements.

Figure 1:
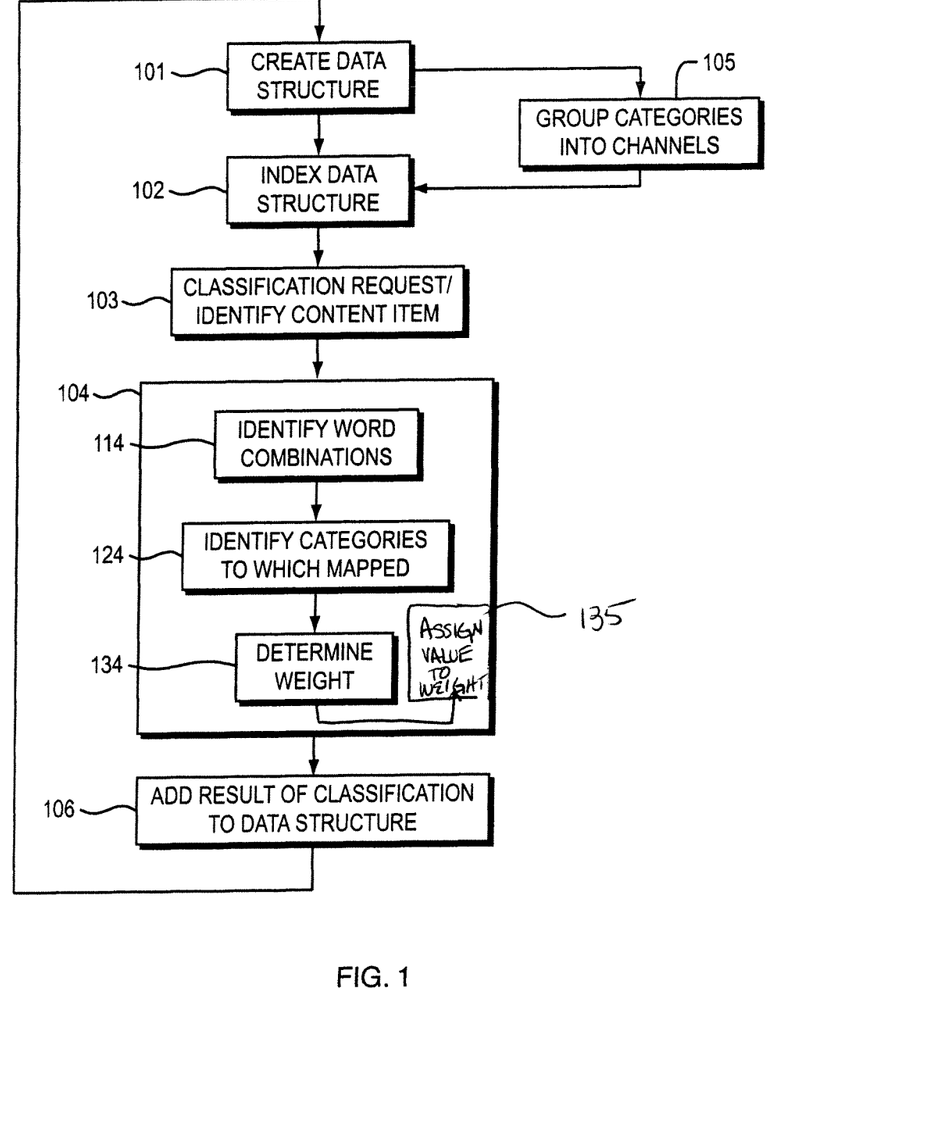
FIG. 1 is a flow diagram illustrating an exemplary method of the present invention.

With reference to FIG. 1, an exemplary method of the present invention is described. Additional details regarding the method, and the system used to carry out the method, are described elsewhere herein. In step 101, a data structure is created by identifying a plurality of words and mapping each word to one or more categories. In step 105, one or more of the categories are grouped in to one or more channels. In step 102, the data structure is indexed. In step 103, an item of content is identified and a request to classify the request is received. If the content item is text, it is classified as described with reference to step 104. If the content item is a URL, an HTTP request must first be made to obtain the content associated with the URL (or, alternatively, classification is performed on the URL itself, without reference to the content on the page to which the URL points). The content is classified, in step 104, based on the data structure. The classifying step includes identifying all one- or more-word combinations in the item of content, in step 114. For each word of at least a pre-determined number of characters in length in each of the word combinations, each of the categories to which it is mapped is identified, in step 124. A weight for each of the words is determined based on an inverse proportion to the number of categories to which it is mapped, in step 134. In some embodiments, a value is assigned to the weight based on a relative relatedness between words using a semantic distance measure, in step 135. In step 106, the result of classifying the content is added to the data structure.

Figure 2:
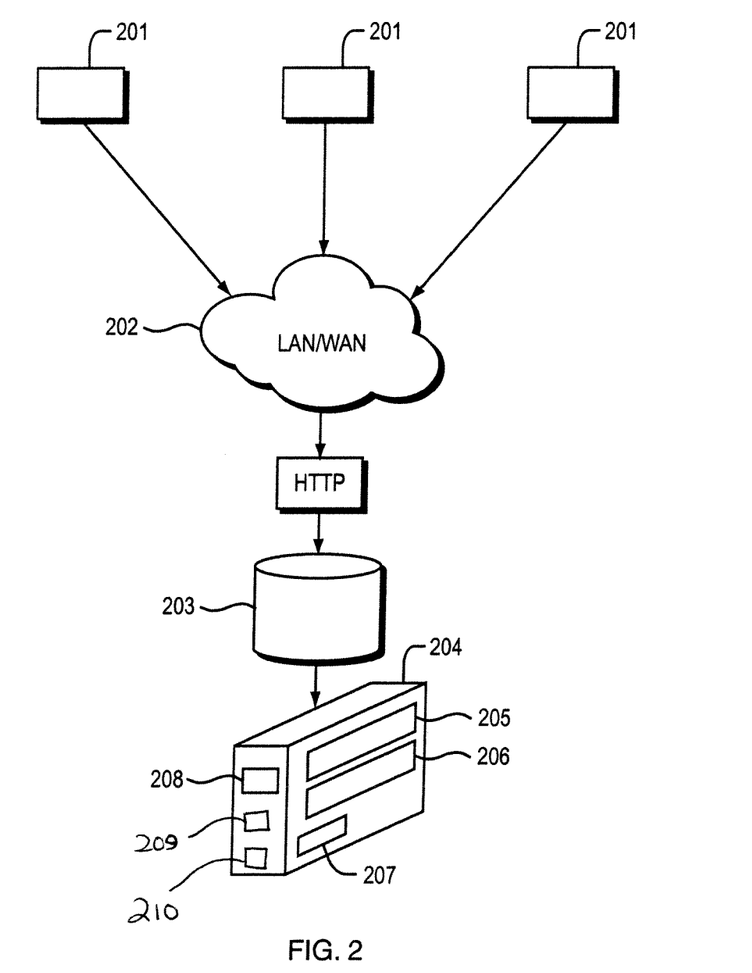
FIG. 2 is a diagram illustrating system components and how such components interact in accordance with the present invention.
Figure 3:
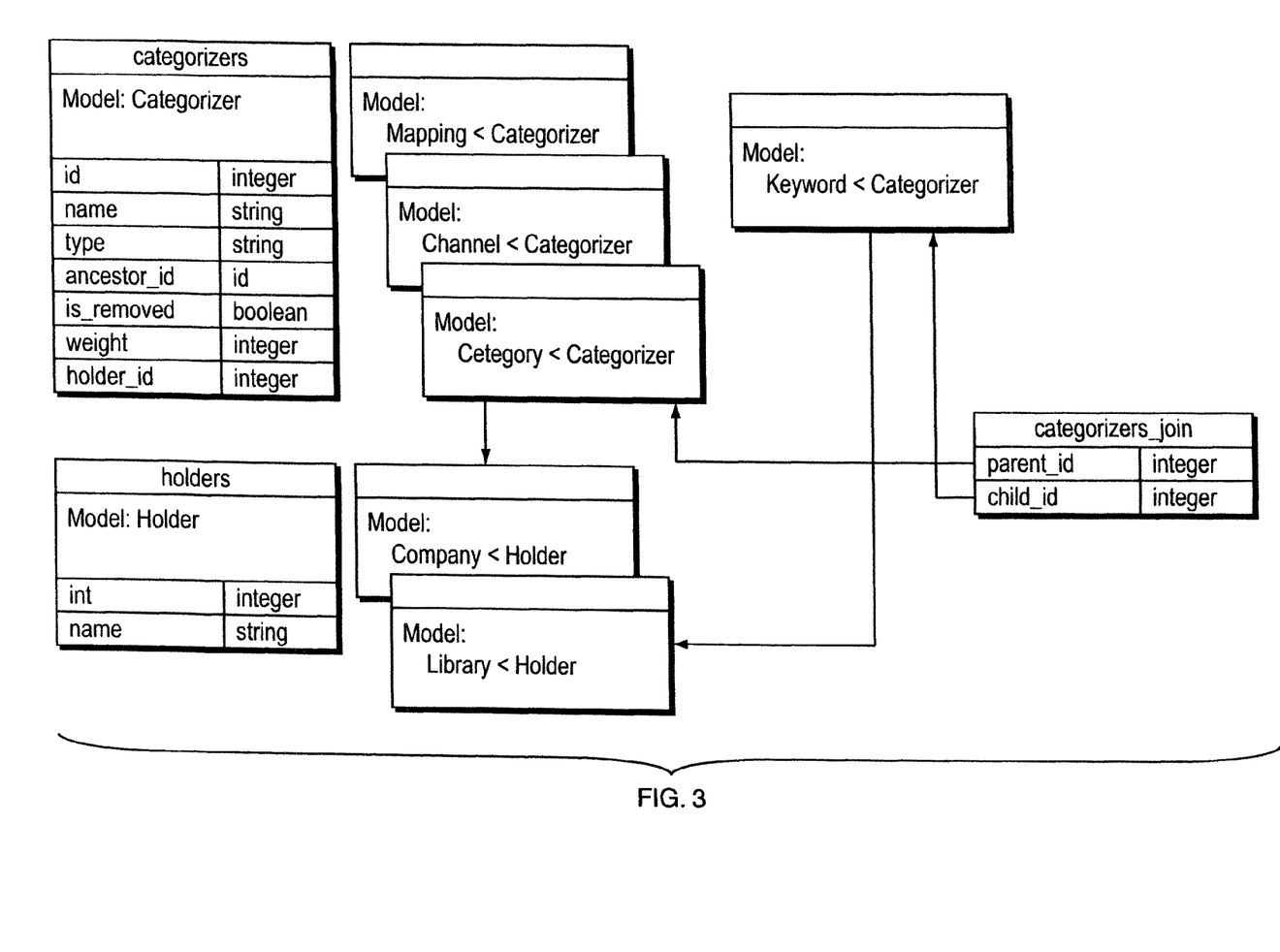
FIG. 3 is a schema of an exemplary mapping model.
Figure 4:
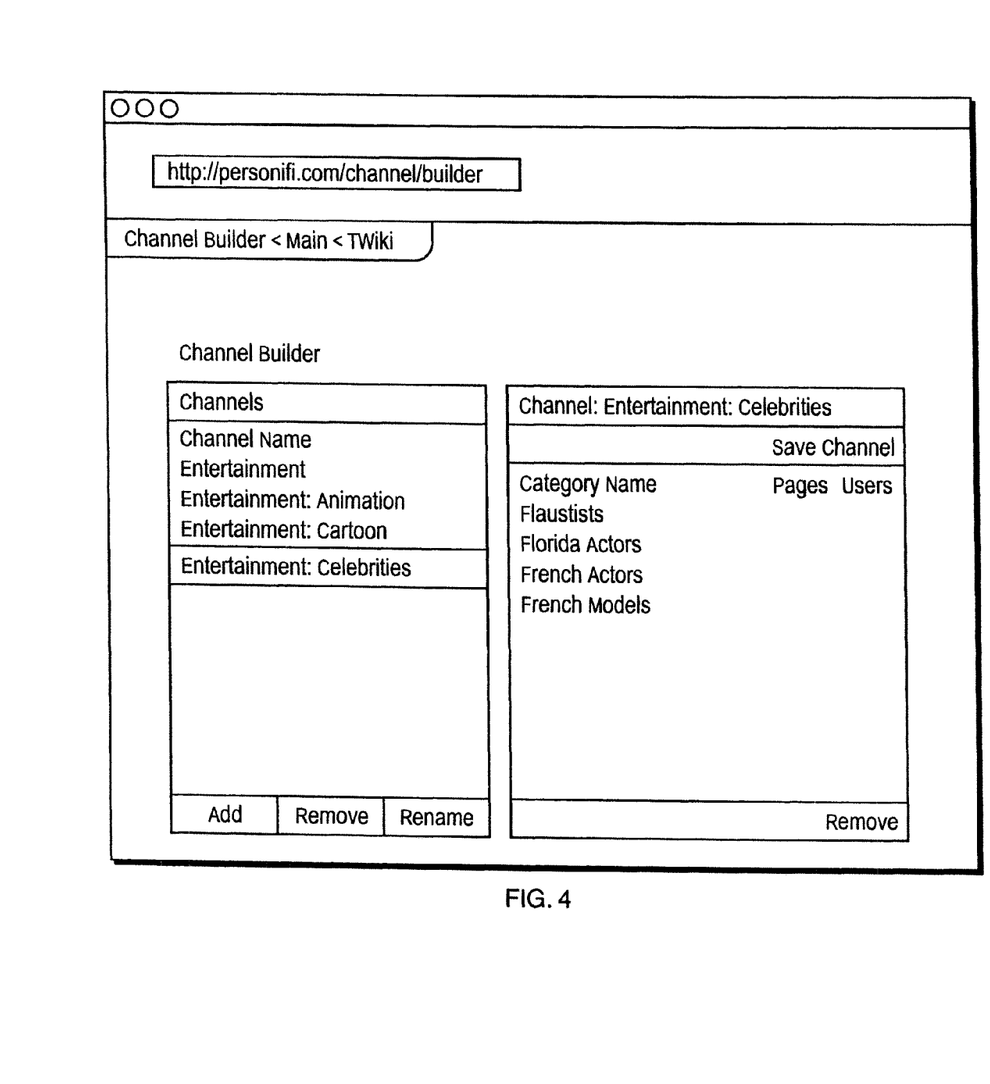
FIG. 4 is an exemplary user interface of the channel builder in accordance with one embodiment of the present invention.
Figure 5:
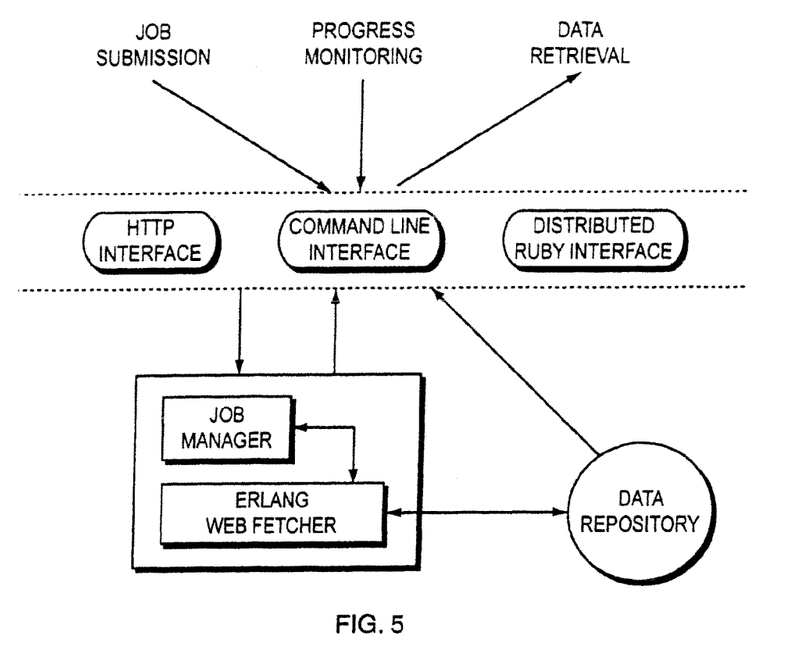
FIGS. 5 and 6 are diagrams illustrating the methods employed by two crawlers in accordance with one embodiment of the present invention.
Figure 6:
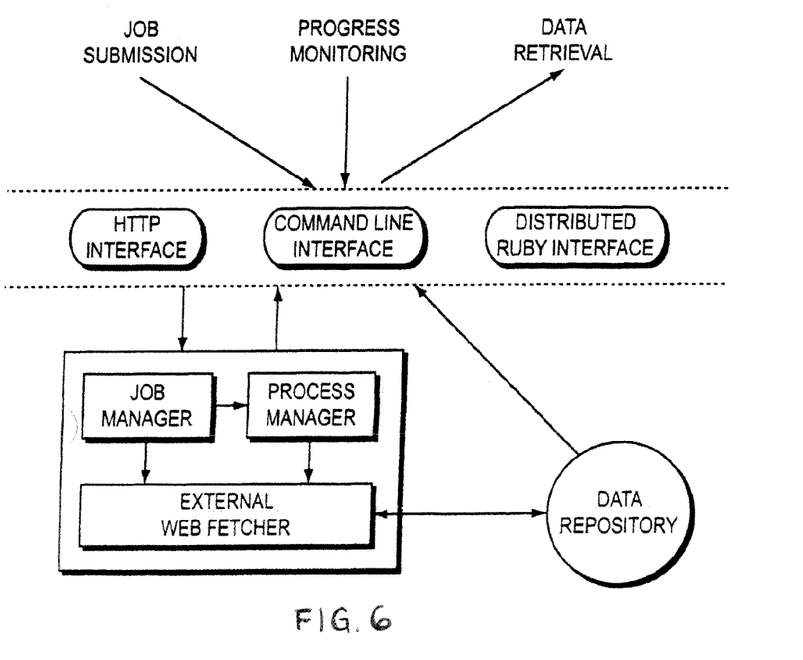

With reference to FIG. 2, an exemplary system for carrying out the present invention is shown. Data sources 201 comprise servers that maintain content accessible over a local area network or, preferably, a wide area network such as the Internet 202. Communication with such data sources 201 is achieved in one embodiment using HTTP. Exemplary data sources 201, as described elsewhere herein, may include news media such as BBC, encyclopedias or user-editable encyclopedic collections such as Wikipedia, and open directories such as DMOZ or ODP, although other data sources can be used within the scope of the present invention. Data obtained from such data sources 201 is maintained in one or more databases 203, which, in one embodiment, comprises a 500 GB hard drive with at least 32 GB of RAM. Database 203 may be stored on or in communication with one or more servers 204. Server(s) 204 includes memory for storing executable software code to perform the methods of the present invention. A processor on the one or more servers may execute the software code to perform the methods of the present invention. The memory may include RAM or a hard drive or other types of memory that are known to one of ordinary skill in the art. In one embodiment, at least 4 GB of RAM is required to store the data structure created. Server 204 may include a data structure generation engine 205 (e.g., a processor) specially programmed to identify words from the data sources and map each word to one or more categories, and perform the other functions as described more detail herein with regard to the creation of the data structure. Server 204 may also include an index generation engine 206 (e.g., a processor) specially programmed to index the data structure, as described in more detail herein. Additionally, server 204 may include a channel builder 207 (e.g., a processor) specially programmed to group categories into channels as described in more detail herein. An exemplary schema for a mapping model is shown in FIG. 3 and an exemplary interface for channel builder 207 is shown in FIG. 4. Thus, server 204 includes processors that are specially programmed to perform statistical difference metric and cluster analysis on the data obtained from data sources 201, and map keywords to categories, as described in more detail herein. Server 204 may also maintain classification engine 208 (e.g., a processor) specially programmed to perform classification in accordance with the embodiments described in detail herein. Content to be classified may be obtained using crawling engines, such as those described with reference to FIGS. 5 and 6. Server 204 may also contain semantic distance engine 209 (e.g., a processor) specially programmed to perform the semantic distance measurements described herein, as well as semantic cache 210 (i.e., memory).

An overview of some of specific features supported by certain embodiments of the present invention is now provided. Content is classified in many, e.g., hundreds of thousands, of low-level categories. Bigger semantic concepts are grouped through creation of a mapped layer with a channel builder tool. An index is built using data sources, including data sources that are human-concept driven, such as, for example, Wikipedia, ODP, and Knoll, which allows for the classification to be more natural and easy to understand. A distance measure is defined, referred to herein as ESD, and can be used in connection with building the index. The data basis is an extremely large corpus of input data, which is discovered automatically using advanced online crawling methodologies. The classification technique used in connection with the present invention supports multi-lingual classification, without need for translation of the content being classified. Support tools may be provided for the fuzzy discovering of related content, as can be used in online advertising or error detection. Each of these technologies, and the manner in which they interact, is described in more detail herein.

In general, classification refers to understanding what a text snippet (a word, a sentence, a paragraph, or an entire document, from a web page, or a portion thereof, from a document, from plain text, etc is about on a detail level and/or a main conceptual level. Enhanced Semantic Distance (ESD) as used herein, refers to the converged distribution of concepts; it is a distance measure that shows the relative relatedness between words, categories, or documents. The channel builder tool, as described herein, is used to develop higher level channels from lower-level categories. For example, many low-level categories may be grouped into one channel.

Both speed and quality are considered in connection with the described classification methods. A weighted word count for words on different topics, which is extremely fast and straight-forward to implement, leads to excellent results, provided one knows all relevant words in all topics and how to weigh them. If enough data is available, complex statistical models are not needed, as the data has converged and a steady/converged distribution can be relied upon to deliver desired results.

A topic, as referred to herein, means what is generally referred to as a category or a semantic concept. "Soccer", for example, is a concept within a hierarchy of concepts with a root of "Sports". Hierarchies can overlap or be ordered in tree-structures. Words can belong to several topics and the final decision as to the meaning of particular word in a particular context is determined at the end of the analysis (i.e., disambiguation).

Statistical techniques are used to generate high quality data structures, which are used as a basis of the classification methods described herein. The first form of data is the discrete structure referred to as a keyword. This is the atomic structure of the exemplary classification system described herein. The second form of data is an association, or grouping, of keywords. The most atomic grouping of keywords is the category. In the exemplary embodiment described herein, the category has no technical difference than any other grouping in the system, but generally is a more universal and less specialized grouping of keywords. A second form of grouping used in the exemplary embodiment of the system described herein is the structure known as a channel. Each channel is composed of multiple categories. The definition of the channels used in the system may be industry-driven and tailored for a given end user of the system.

By way of example of the manner in which keywords are associated with categories, the number of associations between 2.2M Keywords and 200 K Categories is approximately 5M. In connection with an implemented embodiment of the present invention, such numbers rise 10% per month. This demonstrates that the system continuously grows and picks up new concepts as they appear in any statistically significant frequency within the body of text that serves as the basis of the classification system (e.g., pages on the World Wide Web). It also demonstrates that the growth is stable and contained within an expected range of growth that matches conceptual information growth, thereby verifying the high-quality nature of the classification system output.

With regard to implementation of data structures, in connection with low-level classification generation, the following hash-tables can be used:

num2category: Mapping from numbers to human understandable categories;

example: 1=>"Soccer", 2=>"Bird watching", 3=>"Germany", 4=>"USA", etc.

keyword2category: Mapping from keywords to categories (i.e., the identity of categories to which a word belongs).

By way of example, the word "computer" scores in 30604: Computer_hardware

The word "computer" belongs to only one category ("Computer hardware"). The internal identifier of that category is 30640.

The word "tax" belongs to many categories:
14184, Basic_financial concepts
120679, Tax_reform
120682, Taxation
120698, Taxation_in_the_United_tates The word "Paris" belongs to many categories:
23109: Capitals_in_Europe
26882: Cities,_towns_and_villages_in_France
27234: Cities_in_France
35635: Departments_of_France
59003: Host_cities_of_the_Summer_Olympic_Games
90043: Orthodox_Jewish_communities
91142: Paris
134772: World_Heritage_Sites_in_France In connection with the embodiment described herein, the classification method involves consideration of all consecutive 1-word, 2-word and 3-word combinations of the given input text. In other embodiments, this method can be made more complex by making ever longer windows to capture idioms and longer slang expressions. For every word of at least three characters in length, the categories in which it scores are determined. The number of times each category has appeared is determined, and a result is returned identifying the order in which such categories are presented. The system then determines all possibilities in parallel and makes a final decision at the end through a disambiguation process. A weighted vector of categories is then returned in connection with the method.

Thus, the first weighting assigned to a keyword is the reciprocal of the number of categories in which it appears. The rarer keywords are thereby given more weight, and the more common keywords are given less.

In some embodiments, a refinement can be made, pursuant to which longer phrases are weighted with higher weights (i.e., because longer phrases are presumptively more meaningful and more specific). Thus, by way of example, "golden gate bridge" as a single phrase will receive a higher weight than any of its individual words. A multiplier (e.g., 1.5) may be used to bring out this effect (e.g., so that single-word phrases weigh as 1, double words as 3, triple words as 4.5 etc.).

In other embodiments, an additional refinement can be made. In connection with these embodiments, the keywords are treated not as isolated data, but in the context of the categories or channels to which they are assigned. A keyword-channel tuple can be given an arbitrary weight (i.e., either according to human judgment or an algorithmic assignment). In the described embodiment, the default weight is 10 (to allow for small non-zero weights such as 3 or 5 without involving floating-point arithmetic). Weights may be arbitrarily large and may be negative. A negative weight penalizes that choice of keyword-channel.

Keyword ESD provides a way to assign default values to these weights. For example, the mean ESD of a keyword and its neighbor keywords in each channel/category can be found. For example, if a channel/category C has four keywords {k1, k2, k3, k4}, then ESD(k1,C) is calculated as being (ESD(k1, k2)+ESD(k1,k3)+ESD(k1,k4)/3 (a simple arithmetic mean). Because ESD is a true distance, its values are essentially inverse to weights. One solution is to identify a constant, such as 10, and divide by the ESD, as in the following: weight=10/ESD(k1,C) (where the result may be truncated to avoid further floating-point calculations)

With regard to mapped classification, channels can be defined as arrays of low-level categories and used as classification. For example, a channel "automotive" can be defined as out of the following sub-categories:
"auto"==>AMC_engines, AMC_vehicles, ARO_vehicles, Acura_vehicles, Alfa_Romeo_engines, Alfa_Romeo_vehicles, All_wheel_drive_vehicles, Aston_Martin_vehicles, Audi_vehicles, Austin-Healey_vehicles, Austin_vehicles, Auto_parts, Auto_racing, Auto_racing_organizations, Automatic_transmission_tradenames, Automobile_awards, Automobile_engines, Automobile_history_eras, Automobile_layouts, Automobile_platforms, Automobiles, Automotive_accessories, Automotive_chemicals, Automotive_companies_of Italy, Automotive_industry, Automotive_safety_technologies, Automotive_steering_technologies, Automotive_suspension_technologies, Automotive_technologies, Automotive_transmission_technologies, Autozam_vehicles, BMC_engines, BMC_vehicles, BMW_engines, BMW_motorcycles, BMW_platforms, BMW_vehicles, . . . .

By way further example, "basketball" is defined as follows: "basketb"==>ACB_league, ACB_league_managers, ACB_league_players, ACC_Men' s_Basketball_Tournament_Venues, AEK_Athens_basketball_players, AEL_Limassol, AEL_Limassol_players, . . . .

All the keywords can be extracted from the underlying categories and new categories can be made that consist of the keywords in the underlying categories. Data structures consisting of the channel names as categories and the keywords appearing in the categories used in the mapping are generated. The weights of each keyword can be set to 1, or can be more sophisticated by adding the weights of all low-level categories that use that keyword and appear in that one channel. This method provides several advantages, including that it does not require the intermediate stage of counting the number of low-level categories in which the keywords scored and to which channels they belong. It allows involves lean data structures, thereby resulting in memory savings and higher speed.

The following provides an example of a classification result (categories only) in XML-format. This exemplary web page has been classified as healthcare (40%) and science (30%).

```
<?xml version="1.0"?>
<pfi>
<mapped>
<category>
<name>healthcare</name>
<score>0.4<score>
</category>
<category>
<name>science</name>
<score>0.3</score>
</category>
</mapped>
</pfi>
```

In any classification system, a tremendous amount of data must be available. In the exemplary system embodiment described herein, this data exists in two forms: channel categories keywords and channel keywords. In the following example of channel categories keywords, the channel "Pets" maps to a set of categories, each of which maps to a list of keywords:
Pets Dogs, dogs, dog food, cocker spaniel, doberman, . . . .
Cats cats, cat food, litterbox, feline, . . . .
Fish fish, goldfish, betta, aquarium, . . . .

As described previously, a keyword2var data structure can be generated for the mapped results. This method results in a savings in time, memory, and complexity given that the intermediate stage is essentially bypassed, and the keywords are associated directly with a channel.

The following is an example of channel keywords:
Pets dogs, dog food, cocker spaniel,
doberman, cats, cat food, litterbox,
feline, fish, goldfish, betta, aquarium, . . . .

End users can add and delete channels and keywords, in effect, creating their own individualized ad hoc mapping. This can be done at both the channel level and the category level.

A major constraint of many channel building systems is not only storing and using the massive amount of data found in discrete structures like the keywords, but also in the large number of associations linking all of these structures. The problems become amplified when a system needs to support many groupings of channels, with many custom modifications of these associations. To perform classification properly, all data for a given mapping, or grouping of channels, must be available at the time classification is occurring. To produce this massive amount of custom data for each customer, the system must efficiently and effectively replicate and reuse data. The following describes the manner in which this is achieved in the exemplary system described herein.

In particular, to meet such demands, the exemplary channel building tool described herein uses two techniques. The first technique described herein involves reuse, replication and differentiation of data. In particular, it would be very difficult to copy the massive amounts of data needed for custom classification for each customer or mapping. The classification system handles this by reusing keywords, categories, and channels. Because most customizations are small, replication of entire trees of data would be unnecessarily costly. The below described functions allow the system to tie seamlessly efficient data storage with unlimited customization and control. The second technique is referred to as ancestry. Ancestry refers to the linking of objects to minimize the need for replication. When a new mapping is created for a customer, a single mapping object is created and is linked to a preexisting "library" mapping through its ancestor field. The ancestry association tells the system that, when retrieving children for the mapping, or channels, both the ancestor and the mapping object should be queried and merged (merging rules are embedded in the objects, as described below with regard to embedded differentiation rules). While this may result in a slower time of channel association recovery due to the multiple paths, other advantages (described herein with regard to caching) are presented.

The exemplary system described herein may also involve embedded differentiation rules. In particular, in order to merge efficiently two sets of data, rules are embedded in the objects. This allows for quick, efficient merging without the expense of costly lookups. The exemplary system described herein also makes use of differentiation through branch linking. In particular, to allow for efficient modifications, the channel building system does not replicate entire branches, only the link to the trunk. As referred to herein, the trunk of classification data is the mapping object, and branches are the associations linking a mapping to a channel and then to a category. If a customization of a mapping requires the renaming of a category, the entire set of associations under the parent channel need not be recreated. Instead, a copy object, using the ancestry linking described above, is made for each node in the branch, linking the customized category to the trunk.

As noted, the efficiency of storage from ancestry increases the number of queries in the system and adds the need for branch merging. However, the static quality of the ancestry branches lends itself to very efficient caching. Because most branches in a mapping are from ancestors, and because those objects are not similar, but the exact same across many mappings, the step of finding the association of children to an ancestor is a single fast retrieval from a memory cache. This means, for example, that if only 2% of a mapping has diverged, database access will be limited to that 2%, while the other 98% will come straight from a fast memory cache layer. Thus, the complexity of ancestry actually results in faster retrieval times when caching is used.

FIG. 3 is a schema of an exemplary mapping model.

FIG. 4 is a screen shot of interface for an exemplary channeling building tool. This interface can be used by an end user of the system to create custom channels.

Index generation is the process that involves creating the data structures needed to implement text classification in accordance with a preferred embodiment of the present invention. In one embodiment, a source generated by a human is used as a foundation for the base taxonomy. Some exemplary sources include Wikipedia, Knoll, ODP, WikiNews, and other news sites such as BBC and Google News. Various sources may be aggregated in order to maximize the reach of human concepts and access deeper content.

The following is an illustrative example of how to collect human-driven concepts from Wikipedia. Wikipedia allows for the download of content from download.wikipedia.org. The downloaded content is then imported in a relational database and, for each content item (e.g., each article), the title, the content and the categories to which such content item belongs are extracted. Using the extracted data, all page titles of a category are taken as the keywords for that category. For sources such as Wikinews, the categories and a word frequency count can be used instead of the page titles, as the page titles are typically too long. Other sources can be added to provide a more robust data structure. For example, news sources, such as nytimes.com, and their inherent human-driven structure provides new training data on a regular (e.g., daily) basis.

The data structures resulting from such information sources may require refinement. For example, some categories add little or no value to the data structure. Such categories (e.g., that appear more than a few thousand times) can be deleted.

When dealing with Wikipedia, by way of example, a hierarchical tree structure may result, including categories in child/parent relationships. This allows for walking up and down the tree to zoom in and out of categories, e.g., the tree can be walked from "soccer" to "sports" (up the tree—less detail) or to "soccer in the UK" (down the tree—more detail). In some circumstances, nodes are found that are too broad and connect things that humans would not see as connected. Using ESD, these instances can be eliminated by stopping any tree-walk as soon as the ESD-difference between two categories is bigger than a given threshold (e.g., 0.3 as a threshold).

The input basis to the data structure can be expanded by taking into account external links in pages and to treating them as outlined below (with reference to the DMOZ example) combined with the method described above with regard to Wikipedia.

DMOZ (http://www.dmoz.org) is one example of a large link directory that includes sections and links to external pages. In this example, each link is downloaded, including the content of the pages to which the links point. Instead of using the page-titles, as described above in the Wikipedia example, each section is used as a category and the keywords that appear in the pages accessed via the links most frequently are taken.

Once the core-data structure is created, it may be fine-tuned and maintained by methods that include statistical cleaning, the feedback-loop described herein, as well as human efforts such as allowing end users to add/remove words to categories, allowing end users to remove categories, and allowing end users to add categories. These refinements can be maintained in a database (e.g., a Postgres database). Alternatively, human-editable YAML files and saved cached versions can be used to avoid the waiting time at each loading.

In one embodiment, a new index is completed about once every several months, automatically incorporating all human- and statistically-learned changes in the new index.

In some embodiments, the index can be generated without a data structure being created, using ESD. In particular, ESD can be used to perform a cluster analysis on words. A large corpus of documents is reviewed, as it is obtained, for example, from the classification effort described above in an alternate embodiment. A word-count is performed and a certain percentage (e.g., 80%) of the most popular words are taken, minus a certain percentage (e.g., 5%) of the most common words, eliminating stop-words like "he", "she", and "is" by way of example. This defines the keywords that are monitored and with which an ESD-index can be generated. Once the ESD-index is generated, a clustering algorithm, for example, can be used to rebuild categories from these words. Thus, the words that are close to each other in meaning are collected together in one category, allowing for overlap.

Categories can be generated without overlap according to the following process: keywords←all keywords that are important
while no keywords left or no longer enough words to form new categories
  current_word=one random_word(keywords)
  New category=(All keywords where ESD(current_word, word)<threshold)
  The words in the new category are now removed from keywords. end The same approach can be taken to generate categories with overlap. Standard techniques like pruning/trimming can be performed as well.

With regard to creating meaningful names for these new categories, this can be accomplished, for example, either by looking at the output of some sample sets and manually assigning tags, or taking the word that is in the center (e.g., the most striking word is the one that is closest in distance to most other words in that category) of the category as name. ESD can then be used to refine the categories obtained from analyzing the structure like Wikipedia or DMOZ, over ESD, but the ESD-index has since improved in connection with the feedback loop described herein. In some instances, due to noise or topics that do not have enough documents identified for them as of yet, words appear that, for humans, make no sense. Removing all words that are further away than a threshold from the center of the category shows very good results. As discussed previously, words that are close to the center, but not yet in the index, should be added to the index. One example is new words that a customer has added but have not yet been placed in the correct position relative to the threshold. This also occurs when many new documents about specific topics are crawled; more is learned about these topics and they can be added to a category/mapping. Adding words is done non-exclusively, i.e., the same word might be added to two categories that are not very close, as it might have different meanings based on the content.

ESD has other applications, including the following. It may be used for matching of pages and advertisements. In particular, advertisers are often faced with the problem that they have to decide which ads to display on what web pages. Traditionally, they have many thousands of different pages, but only a few hundred different ads. Using ESD, a fuzzy-match can be performed and, despite not having the perfect match, the best possible match, up to a threshold (e.g., 75%), can be detected. Also, ESD can be used to detect outliers/bugs in a mapping. For example, by looking at categories or keywords that are far from the center, a potential source of errors is detected. It can also be used to make recommendations. Users can be saved time finding pages with topics of interest by entering one or several keywords, and thousands of similar ones are returned. ESD can also be used for probabilities, in that it can be used to reduce the number of categories, which can be helpful, e.g., for ads-page classification matching. With ESD alone, a decision tree for classification can be used.

The system described herein allow for at least two access methods to the API: instant real time results on a page-by-page basis, via Javascript (JSON) or a dedicated http-call to server(s); or as a batch process, pursuant to which users submit pages and/or advertisements, that are then classified (and possibly matched up with their ads) and the results are returned in single pass. Thus, many URLs are downloaded which, in return, are fed into the classification index and ESD so that, over time, the algorithms are automatically trained on exactly the kind of data that the customers are viewing (i.e., referred to herein as the feedback loop).

For the first access method, the full URL of the page is obtained. If the Javascript is run in an iframe, by way of example, the DOM-tree in the browser is walked up as far as possible. Using Javascript/JSON, it can be seen on the fly how a page is classified and this can be passed as a key-value pair to the ad-server in charge, so that the right ads can be served at the time.

At least two types of content (e.g., advertising content, by way of example) can be classified in accordance with the systems and methods described herein: text based content, which is classified by combining the page-content behind the content to be classified and the text of the content to be classified; and graphical content, which is crawled and the resulting page behind the content is classified.

Classification has many uses, including the following. Fuzzy and non-fuzzy matching of ads and pages can be accomplished either with ESD or by walking up the hierarchy to the parent of a classification. Walking up the hierarchy (rolling up detail) is like zooming out so that the larger picture is revealed. Classification can also be used for knowledge management (e.g., finding similar content); understanding content and intelligence gathering (e.g., federated media trying to understand about what topics it has blogs); and recommendation of similar content. Classification can be used to personalize content, as well as in connection with contextual and behavioral (i.e., context over time) online advertisements. It can also be used in connection with content and spam filtering.

The crawlers used in connection with the present invention are now described. In an exemplary embodiment, a large number of pages is crawled for classification purposes—sometimes entire domains. Images and binaries are ignored in the preferred embodiment. These are pages on which customers want to display ads or to better understand their inventory, e.g. blogs that get positioned to online advertisers. Crawlers may be used for classifying pages and then caching the requests (high-performance, memcache); as input to match online ads with URLs or domains; and either in real-time or as batch.

One embodiment of the present invention makes use of a crawler and caching (retrieval) at the same time. One exemplary interface that can be used in connection with this embodiment is a webserver on an intranet (i.e., a caching proxy server). In this embodiment, one large cache is available for all needs, and intranet access is very fast. The parameters for such a service include:

domain or URL
  max time
  random wait between hits (avoid banning)
  max # of pages to download
  max # bytes to download
  max wait-time per page
  max wait-time per domain
  depth
  min page size
  max page size
  language: english, spanish, all, etc.

The crawler makes use of multiple machines and multiple processes as needed. A switch (i.e., strict/lenient) is used when deciding whether a link is on the same domain (e.g., whether abc.foo.com should be considered part of foo.com). Optionally, the HTML may be stripped out, or it may be kept. Pictures and binaries, by way of example, are filtered out (although file names may be left in for the classifier). The robots.txt files are honored when they are found. Cookies are stored and updated to deal with pages that need a user-login (i.e., the crawler essentially behaves like a user, logins in and sets the corresponding cookies). Parameters and information are recorded for each domain, by way of example: when crawled last; to what depth; bytes returned; pages stored; pages discarded (too small, binary, not English, etc.). Assuming the webserver is used, a special URL may be used to return the full text of the domain (e.g., www.abc.com/--domain). Similar special URLs for other things such as crawling parameters/metadata etc. may also be used, e.g.:

www.abc.com/--info # info on crawl of abc.com
/--progress # now crawling abc.com, #589 of 1000 in batch . . . .

Each page crawled is classified and the page content is saved for ESD-index updates.

The URL Crawler differs from the domain Crawler chiefly in speed and simplicity of internal implementation of the actual crawler itself. The interfaces (command line, web, and drb) and the data storage schemes are the same, in the described embodiment. A Ruby wrapper invokes the links executable repeatedly, with a thread-safe queue ensuring that only a fixed number of downloads are running concurrently. Downloads that exceed the specified limit are killed and the slot is given to a new links process.

These crawlers differ from standard search engine crawlers in at least the following ways. An index is not built based on all the keywords, but based on categories or keyword counts per document (to update the ESD-index). So, if the only concern is keyword ESD, the entire page-content can be thrown away and only a certain number (e.g., three) of the top categories per page (instead of all keywords) need to be saved. Statistical capture/recapture methods are used to estimate the true count of categories behind a domain without necessarily always exhaustively classifying all pages behind a domain. Different priorities are dealt with (e.g., give me a result as fast as possible, or simply put it in the queue and wait until resources become available). Based on the usage-requests from the classification customers, the importance of a url is known in real-time. Based on the number of times a url is requested, it is given more priority to be crawled. This action, combined with the assumption that not all users are interested in all topics, allows the entire internet to be crawled and the long-tail can be survived in an economical way. Only the pages customers need are crawled, unlike a search engine that follows every possible page.

Speed classification can also be accomplished using the embodiments of the invention described herein. For example, in order to classify a page without looking at its content, the URL can be analyzed to determine if it has a descriptive name. When a new URL not yet seen or downloaded is obtained (and, thus, the content is not yet classified), but it is desired to send a result immediately back to the customer, a technique called speed classification is used. This technique looks only at the request URL and returns a result at once. This works by allowing the user to specify a few simple rules, as well as classifying the URL, but broken into the individual words it contains.

Using the channel builder, end users can input domains, partial matches and keywords. These inputs are then processed in the following order: if a partial match, the result is returned; if no match, domain match is tried; if domain matches, the result is returned; if domain does not match, keyword match will be returned. Keywords mean that classification algorithms are applied on these special data-structures. Alternatively, full detailed data structures can be used. This technique also allows the customer to fix the results, e.g., for the domain pets.com, always returns the channel "pets", while for others, go and do the full detail work. This approach works as well, as many websites have some structuring done by their editors.

The different embodiments of the present invention provide a number of advantages. The system can scale to hundreds of thousands of categories. The structure or ESD of the input data can be taken advantage of to come up with high-quality keywords. Keywords can be added and removed, and the weighting of keywords can be changed, on the fly. Results are easy to understand and geared to match the expectations of sales-people, simply by adding/removing keywords. The relatedness between multi-word terms, whole sentences or documents can be measured. The system and methods described herein deal with non-incremental vocabulary and does not require long pre-processing times, so that one can accomplish simple manipulations at run time. New knowledge is automatically gained and relatedness between multi-word term, non-incremental vocabulary is measured. The methods described herein take into account the given category-structure (grouping and linking of articles) and the page titles. This way, much more common-sense and domain-specific knowledge is captured through the groupings entered by human beings that write and order content (e.g., Wikipedia articles), in addition to being more sophisticated in speed and quality. A weighted inverted index is created out of the structure (e.g., grouping) and Wikipedia articles which, with some insights (like the value of short page titles), result in a fast and manageable, frequency-count based classification. The present method makes use of categories, which is more general and allows the merging of different input data sources, as long as common categories are used (e.g. merging of en.wikipedia.org and en.wikinews.org). Also, the methods described herein show how mappings and adding/removing of knowledge (e.g. adding/removing of keywords, strong bonds, etc.) can be done. The methods described herein also allow for modifications/customizations by the end user in view of the categories employed by the methods, with which humans are familiar and in view of the automatic capture of common sense and domain-specific knowledge.

Other features of certain embodiments of the present invention are as follows. Certain embodiments allow for multilingual capabilities. In particular, structured data like Wikipedia exists in many languages. By applying the same algorithms (as described herein), e.g., German, French or Spanish indexes can be built. Stop words are counted in different languages to determine the language of the text to classify. If low-level categories are being worked on and a large pool of classification results are being kept, inventory can be forecast, and inventory of new mappings can be forecast before they go into production. The methods also provide for steady, automatic quality improvements, as all downloaded content is fed back in the feedback loop. In particular, all data that is classified is used as input for ESD to further fine-tine the classification. Thus, the classification keeps getting trained with the data that is most relevant to the customers. The present invention also allows for handling of html/javascript. In particular, a page is fully rendered (including all iframes, javascript, etc.) and the rendered page is converted into text as input for classification. This provides a significant positive impact on classification results. The present invention also allows for end users to indicate word bonds (e.g., make sure two words appear in a document). It also allows for dealing with classification of pages that do not focus on a single topic. For example, the home page a newspaper typically will includes articles of many different topics. In order to manage this, for example, some rules may be established, which can be as simple as matching a list of known strings that always return "Miscellaneous" for pages that focus on multiple topics. Some embodiments of the present invention recognize the importance of the order in the url-request path—e.g., in x.com/a/b the a should be given more weight than the b. The classification system of the present invention is bettered with more input—for example, additional tags or other meta information for a page can be added to the classification input, thereby improving it. The present invention also supports cleaning rules to remove noise (e.g., delete categories that have too many hits and add little value, delete categories with numbers in the name that are too detailed, unless wanted.

A more detailed discussion of the ESD methodologies is now provided. By way of overview, traditional semantic distance calculations require vast document sets across which large numbers of English words are run to measure distances. Using the methodologies described herein, the power of an ad network with a large reach is leveraged to determine the base set of pages that are of the most interest. Thus, for example, given an Internet advertising network, web pages on the network that are accessed by individuals (and a determination is made as to whether to serve an advertisement to such individual and which advertisement to serve) are of interest to those individuals, i.e., because they are accessing them. Thus, a set of Internet pages of interest (which is a subset of all pages on the Internet) are identified through use of the advertising network.

A bootstrapping method, such as a "capture-recapture" technique, is then used to build out the balance of the document set. As described in "The WEB Archives: A time-machine in your pocket!", Chavez-Demoulin, V., Roehrl, R. A., Roehrl, A. S. A., Weinberg, A., Internet Archive Colloquim 2000, http://www.approximity.cokm/papers/archive13/node8.html, which is hereby incorporated by reference in its entirety, "capture-recapture" can be used to estimate the unknown size E of the number of Internet pages. This involves identifying a sample (sample 1) of $n_1$ pages in the Internet, and then to extract a second sample of $n_2$ pages (sample 2). Let $m_2$ be the number of pages already identified in sample 1. Assuming that $m_2/n_2 \sim n_1/E$, we get the estimate $$\hat{E} = n_1 n_2 / m_2.$$

When ($n1+n2 \geq E$), the modified estimate $$\hat{E} = (n_1+1)(n_2+1)/(m_2+1)-1$$

provides a more accurate estimate.

Using such a technique, the number of documents (and, thus, words) that have to be processed are narrowed down. This, coupled with the algorithm described below, provide a scalable method for performing semantic distance calculations. Using these methodologies, semantic distance is usable in the media space because scale issues (i.e., speed, complexity, size) are accounted for.

Overcoming the information overload factor of Internet data processing is essential before a business can take advantage of marketing and data retrieval opportunities. Web site and url classification becomes a critical tool in the process of managing an inventory of electronic advertisements and behavioral targeting applications relating thereto. The dynamic nature of the data requires a system of category development that can rapidly evolve as the requirements and topics change. The methodologies described herein present a strategy of dynamic category development based on keyword semantic distance measurements taken directly from scanned Internet documents. Such methodologies address the classic scaling issues that plague semantic distance implementations.

In particular, one of the biggest issues with semantic distance index building is to know what to index. As referred to above, the number of calculations required to calculate all the words in any language is quite daunting, particularly when word combinations and slang terms are considered. As a solution, only the keywords, phrases, and word combinations on the pages visited in the network are semantically indexed and cached.

Further, over time, any index can grow to an unmanageable size. The more pages visited over time, the more keywords, phrases, and word combinations are semantically indexed and cached. As a solution, the index is stored in an expiring cache 210 (see FIG. 2). Each time a topic is semantically indexed and cached, a timer starts to expiration. In one implementation, the expiration time is approximately a month, but can be set for longer periods to catch seasonality and unique events. Keywords, phrases, or word combinations that have been previously indexed and cached will have their cache timer reset. This preserves the most salient keywords, phrases, and word combinations while allowing infrequent ones to expire.

Still further, at least certain of the semantic engines are very slow to calculate the distances between keywords, phrases, and word combinations. As a solution, with reference to FIG. 2, the semantic engine 209 is fed directly from the web crawlers as classification requests come in. The scoring mechanism does not perform an exact count on documents in the equations, but rather does a very smart approximation. This approximation allows for much quicker calculations without giving up any significant accuracy in distance calculation. Once the calculations have been made, the semantic engine 209 then places newly scored keywords, phrases, and word combinations into the cache 210. Once in a cached 210, the results are immediately available during the classification process.

The semantic distance process can be described as follows with reference to FIG. 2. Requests for classification of one or more Internet pages (from content sources 201 are sent over the Internet 202 via http. Pages are sent to crawlers. Keywords, phrases, and word combinations are indexed and cached at server(s) 204. Classification engine 208 calls semantic cache 210 and employs semantic engine 209 as part of classifying page. The classification index is updated and cached.

With reference to Table (1), the model for calculating semantic distances is described. Let $n_i$ be the number of documents containing the keyword indexed by i and $n_j$ be the number of documents containing the keyword indexed by j. Then, $n_{ij}$ denotes the number of documents containing both keywords indexed by i and j. Let n be the total number of documents in the model. A 2×2 contingency table is generated as follows:

| | | Keyword j | | | |
|---|---|---|---|---|---|
| | | has j | not j | totals | |
| Keyword i | has i | $m_{11} = n_{ij}$ | $m_{12} = n_i - n_{ij}$ | $m_{1+} = n_i$ | (1) |
| | not i | $m_{21} = n_j - n_{ij}$ | $m_{22} = n - n_i - n_j + n_{ij}$ | $m_{2+} = m_{21} + m_{22}$ | |
| | totals | $m_{+1} = n_j$ | $m_{+2} = m_{12} + m_{22}$ | n | | where the various cells counts $m_{ab}$ are calculated as shown.

Goodman and Kruskal, (Goodman, L. A. and W. H. Kruskal, *Measures of Association for Cross Classifications*, New York, Springer-Verlag (1979), incorporated herein by reference in its entirety) developed a statistical model that measures the reduction in variance of the conditional predicted counts of a contingency table called the concentration coefficient. The Formula (2), using the counts in Table (1), is as follows:

$$\tau = \frac{\frac{m_{11}^2}{nm_{1+}} + \frac{m_{12}^2}{nm_{1+}} + \frac{m_{21}^2}{nm_{2+}} + \frac{m_{22}^2}{nm_{2+}} - \left(\frac{m_{+1}}{n}\right)^2 - \left(\frac{m_{+2}}{n}\right)^2}{1 - \left(\frac{m_{+1}}{n}\right)^2 - \left(\frac{m_{+2}}{n}\right)^2}. \quad (2)$$

τ represents the proportional factor of reduced variance due to the use of conditional probabilities and will be close to 1 when there is strong association and close to 0 when there is a little association (i.e., the factors are independent). τ−1 is used herein as a measure of semantic distance because of its unitless, bounded, well-behaved nature and ease of calculation. For a more complete description of methods dealing with nominal data analysis and alternative dependency measurements, see Agresti, A., *Categorical Data Analysis*, John Wiley & Sons, Inc. (1990), which is incorporated herein by reference in its entirety.

The following provides an example of the above-described model. After scanning 43,816,134 Internet blog posts, 316,481 documents were found to contain the keyword "breakfast"; 580,270 documents were found to contain the keyword "lunch"; and 76,877 documents were found to contain both "breakfast" and "lunch". The counts are tabulated as follows:

|  |  | lunch | | |
|---|---|---|---|---|
|  |  | has | not | totals |
| breakfast | has | 76877 | 239604 | 316481 |
|  | not | 503393 | 42996260 | 43499653 |
|  | totals | 580270 | 43235864 | 43816134 |

1-tau = 0.97063304

Using those numbers into Formula (2), it is found that 1−τ=0.97063. The following shows the relatively small calculated semantic distance for the other keywords:

| Keyword: breakfast | | | |
|---|---|---|---|
|  | $n_j$ | $n_{ij}$ | 1-tau |
| lunch | 580270 | 76877 | 0.97063 |
| dinner | 803680 | 81660 | 0.97658 |
| ate | 380330 | 37700 | 0.98958 |
| food | 1134050 | 66183 | 0.99014 |
| bacon | 61959 | 13360 | 0.99139 |
| pancakes | 36690 | 9904 | 0.99191 | n = 47146159
$n_i$ = 316481

Considering the potential for a very large repository of keyword counts, it may be necessary to implement an algorithm that limits the data stored to a minimally sufficient amount to make the required calculations. One way to accomplish this involves storing only those counts that reach some threshold in a sparse matrix data structure. Typical sparse matrix storage schemes do not allocate storage for each cell of a matrix; instead, they store each cell independently with a key access method that involves the two indexes. For very large document repositories, counts below some threshold may also be left out of storage.

Processing requirements may also restrict the breadth of comparisons. Using the definitions above, the following statistics are tabulated to make the necessary distance calculations for comparing two keywords: n, $n_i$, $n_j$, $n_{ij}$. To compare one keyword to K other keywords, then, will require 2K+2 statistics and K independent 1-tau calculations. These could be done in parallel. Without any processing restrictions, it is possible to compare any given keyword with all other keywords whose counts have exceeded the data-storage threshold. However, this may not be realistic for an interactive system.

Thus, the question arises as to which keywords to consider for comparison. One option would be to choose the L keywords whose $n_{ij}$ value is the greatest. This works well as long as L is large enough. For the "breakfast" example above, the 500 keywords with the largest $n_{ij}$ values were selected and the semantic distance calculated between each of them and "breakfast." The six with the smallest distance have been displayed in the example above. It is interesting to note that "bacon" and "pancakes", ranked number five and six by semantic distance was ranked numbers 120 and 191 respectively in $n_{ij}$ values. It is important, then, to make L large enough to capture those obscure but meaningful observations hidden in the noise.

The methods developed above can be used to augment the classification process in various ways. A semantic neighbor function could be very useful in expanding a sparse list of keywords selected for an Internet advertising campaign, for example. Semantic distance could also be used to clean up existing category lists of keywords by expelling keywords that do not meet some associative property threshold. A powerful application, however, is to use the methods described herein to develop categorical lists of keywords directly from the collected data. This would provide a dynamically adapting classification structure closely linked to the data of interest.

For example, an internet advertising campaign is designed to target baseball fans. After processing 47,146,159 blog posts, the following counts are tabulated:

| Keyword: baseball | | | |
|---|---|---|---|
|  | $n_j$ | $n_{ij}$ | 1-tau |
| mlb | 100050 | 25640 | 0.953966 |
| sports | 420841 | 43229 | 0.969767 |
| spring training | 21310 | 9290 | 0.971400 |
| sox | 50510 | 13710 | 0.973922 |
| pitcher | 32730 | 47648 | 0.980118 |
| slug | 83823 | 4580 | 0.984710 |
| game | 1178130 | 3550 | 0.987859 |
| home run | 13870 | 4780 | 0.989368 | n = 47146159
$n_i$ = 140160

These alternative keywords are shown to be semantically close to baseball in that they not only appear often in the same blogs, but they are mathematically correlated and can be used to expand the reach of the baseball campaign. Thus, an advertisement in the campaign would be served not just to viewers of a page that contains the keyword baseball, but also to viewers of a page that contains one or more of the alternative keywords referenced above.

Referring now to dynamic category generation with clustering, consider categories of keywords that naturally emerge from the documents in the repository lending structure and agglomeration to otherwise unrelated phrases. Then, in reverse, this structure can be used to classify and organize the original documents as well as others that are similar in nature. To accomplish all of this, the AGNES clustering method can be used, as described in Kaufman, L. and P. J. Rousseeuw, *Finding Groups in Data, An Introduction to Cluster Analysis*, Wiley Series in Probability and Statistics (2005), which is hereby incorporated by reference in its entirety. This bottom-up algorithm begins with each object in its own cluster and iteratively joins the two closest clusters until only one cluster that contains all of the objects remains. Once complete, a tree structure of keyword categories is returned. With keyword phrases at the root, and successively larger agglomerations as the tree is traversed, this category tree can be used to group documents into dynamic empirically generated classifications based on keyword phrases found in the document.

To begin the process, a dissimilarity matrix is required. This matrix measures the semantic distance from any keyword to all others. Let D be a dissimilarity matrix with I rows and columns. Each cell, $d_{ij}$, represents the semantic distance $(1-\tau)$ between keywords indexed by i and j as calculated using equation (2). Notice that $d_{ii}=0$ (i.e., diagonal values are zero) and the matrix is reflexive about the diagonal. In other words, since $d_{ij}=d_{ji}$, only the lower or upper half of the matrix needs to be specified. Due to the threshold and sparse data structure employed when collecting the data, all values not found in the data store will be set to 1.0 when assembling the matrix D.

As clusters are combined, matrix D is modified to represent the new structure. Rows and columns are dropped and new values are calculated accordingly. Suppose, for instance, that cluster {a} is combined with cluster {b} to form cluster {a,b}. Those rows and columns associated with clusters {a} and {b} are dropped and a new row/column representing distances from {a, b} is appended.

There are various methods for calculating the distance measurements from one cluster to another. By way of example, the average dissimilarly measure, as described in Sokal, R. R., and Michener, C. D., *A Statistical Method for Evaluating Systematic Relationships*, Univ. Kansas Sci. Bull., 38, 1409-1438 [1.2.4, 1.2.5, 5.1, 5.4.1, 5.5.1] (1958), which is incorporated by referenced in its entirety, is used. Referring to Formula (3), given that L is the number of objects in cluster $\Gamma$ and T is the number of objects in cluster $\Gamma$, $$d(\Gamma, \Theta) = \frac{\sum_{\substack{l \in \Gamma \\ t \in \Theta}} d(l, t)}{LT}. \quad (3)$$

Given the matrix D, the algorithm is described as follows:
Start with all objects in their own clusters.
Find the $D_{ij}$ with the smallest value. Select clusters i and j.
Join the selected clusters, drop the corresponding rows/columns from D.
Calculate the distances from the new cluster to all other clusters using equation (3) and append them to D.
If there is still more than one cluster, go back to step 2.
The resulting tree structure is maintained and the algorithm proceeds.

Figure 7:
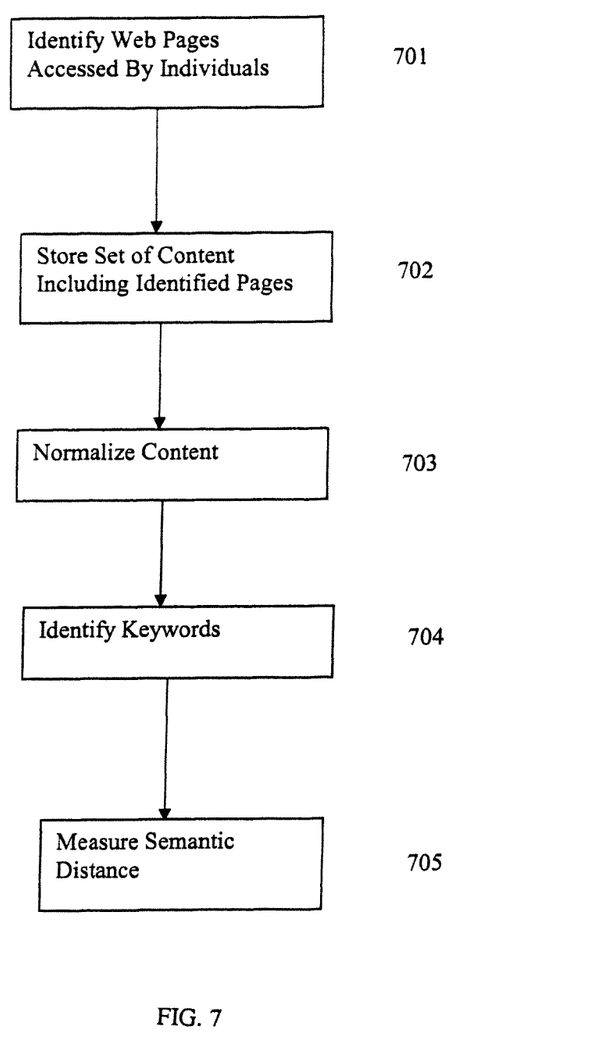
FIG. 7 is a flow diagram illustrating an exemplary method of the present invention.

With reference to FIG. 7, a flow diagram is shown, illustrating a method of the present invention. Items of electronic content accessed by individuals over a global communications network are identified in step 701. A set of content that includes the identified items of electronic content is stored in step 702. The set of content is normalized in step 703. Each of the keywords contained the set of content is identified in step 704 and a semantic distance between each of the identified keywords is measured in step 705.

It will be apparent to those skilled in the art that various modifications and variations can be made in the a system and method for school district improvement of the present invention without departing form the spirit or scope of the invention. Thus, it is intended that the present invention cover the modifications and variations of this invention provided they come within the scope of the appended claims and their equivalents.

What is claimed is:

1. A non-transitory computer readable storage medium having stored thereon computer executable instructions that, when executed on a computer, configure the computer to perform a method comprising:

identifying a plurality of items of electronic content that have been accessed by a plurality of individuals over a global communications network and on which an advertising serving entity has a capability of delivering at least one digital advertisement to each of the plurality of individuals on the global communications network, wherein the plurality of items of electronic content accessed by the plurality of individuals over the global communications network is a subset of items of electronic content that is less than an entire set of items of electronic content that is accessible by the plurality of individuals over the global communications network;

storing a set of content comprising the plurality of identified items of electronic content;

normalizing the set of content;

identifying each of a plurality of keywords contained in the set of content; and measuring a semantic distance between each of the identified keywords using a total number of content items in the set, a number of at least one of the plurality of keywords in the set and a number of at least one other of the plurality of keywords in the set; and upon an individual accessing an item of electronic content on the global communications network, selecting one or more digital advertisements to serve to the individual by the advertising serving entity in connection with an advertising campaign based on at least the measured semantic distance and content of the item of electronic content, wherein measuring the semantic distance is calculated as $1-\tau$ wherein Keyword i is one of the identified keywords;
Keyword j is another one of the identified keywords;
a semantic distance between Keyword i and Keyword j is to be measured;
n is a total number of content items in the set;
$n_i$ is a number of content items in the set that contain a keyword indexed by i;
$n_j$ is a number of content items in the set that contain a keyword indexed by j;
$n_{ij}$ is a number of the content items containing both keywords indexed by i and j;
$m_{11}$ is equal to $n_{ij}$;
$m_{12}$ is equal to $n_i - n_{ij}$;
$m_{21}$ is equal to $n_j - n_{ij}$;
$m_{22}$ is equal to $n - n_i - n_j + n_{ij}$;
$m_{+1}$ is equal to $n_i$;
$m_{+2}$ is equal to $m_{12} + m_{22}$;
$m_{i+}$ is equal to $n_i$;
$m_{2+}$ is equal to $m_{21} + m_{22}$; and $$\tau = \frac{\frac{m_{11}^2}{nm_{1+}} + \frac{m_{12}^2}{nm_{1+}} + \frac{m_{21}^2}{nm_{2+}} + \frac{m_{22}^2}{nm_{2+}} - \left(\frac{m_{+1}}{n}\right)^2 - \left(\frac{m_{+2}}{n}\right)^2}{1 - \left(\frac{m_{+1}}{n}\right)^2 - \left(\frac{m_{+2}}{n}\right)^2}.$$

2. The computer readable storage medium of claim 1, the method further comprising:
classifying each of the plurality of identified items of electronic content in the set using, at least in part, the measured semantic distance.

3. The computer readable storage medium of claim 1 wherein the normalization is performed using a capture-recapture methodology.

4. A system comprising:

memory operable to store at least one program; and at least one processor communicatively coupled to the memory, in which the at least one program, when executed by the at least one processor, causes the at least one processor to perform a method comprising the steps of:

identifying a plurality of items of electronic content that have been accessed by a plurality of individuals over a global communications network and on which an advertising serving entity has a capability of delivering at least one digital advertisement to each of the plurality of individuals on the global communications network, wherein the plurality of items of electronic content accessed by the plurality of individuals over the global communications network is a subset of items of electronic content that is less than an entire set of items of electronic content that is accessible by the plurality of individuals over the global communications network;

storing a set of content comprising the plurality of identified items of electronic content;

normalizing the set of content;

identifying each of a plurality of keywords contained in the set of content; and measuring a semantic distance between each of the identified keywords using a total number of content items in the set, a number of at least one of the plurality of keywords in the set and a number of at least one other of the plurality of keywords in the set; and upon an individual accessing an item of electronic content on the global communications network, selecting one or more digital advertisements to serve to the individual by the advertising serving entity in connection with an advertising campaign based on at least the measured semantic distance and content of the item of electronic content, wherein measuring the semantic distance is calculated as $1-\tau$ wherein Keyword i is one of the identified keywords;

Keyword j is another one of the identified keywords;

a semantic distance between Keyword i and Keyword j is to be measured;

n is a total number of content items in the set;

$n_i$ is a number of content items in the set that contain a keyword indexed by i;

$n_j$ is a number of content items in the set that contain a keyword indexed by j;

$n_{ij}$ is a number of the content items containing both keywords indexed by i and j;

$m_{11}$ is equal to $n_{ij}$;

$m_{12}$ is equal to $n_i - n_{ij}$;

$m_{21}$ is equal to $n_j - n_{ij}$;

$m_{22}$ is equal to $n - n_i - n_j + n_{ij}$;

$m_{+1}$ is equal to $n_j$;

$m_{+2}$ is equal to $m_{12} + m_{22}$;

$m_{1+}$ is equal to $n_i$;

$m_{2+}$ is equal to $m_{21} + m_{22}$; and $$\tau = \frac{\frac{m_{11}^2}{nm_{1+}} + \frac{m_{12}^2}{nm_{1+}} + \frac{m_{21}^2}{nm_{2+}} + \frac{m_{22}^2}{nm_{2+}} - \left(\frac{m_{+1}}{n}\right)^2 - \left(\frac{m_{+2}}{n}\right)^2}{1 - \left(\frac{m_{+1}}{n}\right)^2 - \left(\frac{m_{+2}}{n}\right)^2}.$$

5. The system of claim 4, the method further comprising:

classifying each of the plurality of identified items of electronic content in the set using, at least in part, the measured semantic distance.

6. The system of claim 4 wherein the normalization is performed using a capture-recapture methodology.

* * * * *